No. 855,870. PATENTED JUNE 4, 1907.
C. WITTKOWSKY.
METHOD OF WATERPROOF UNITING PIECES OF WOOD.
APPLICATION FILED JAN. 4, 1907.
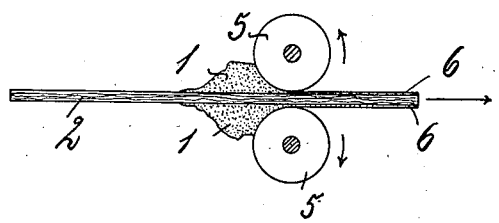
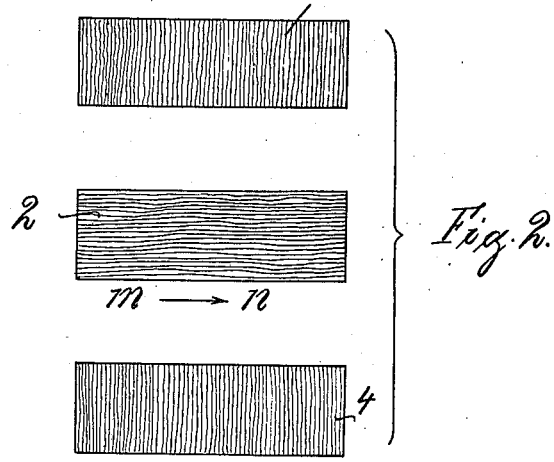
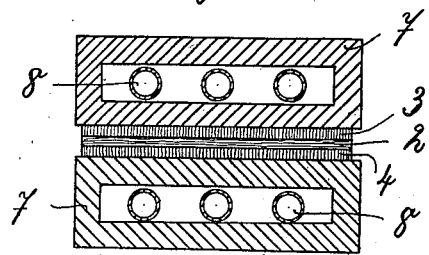
Witnesses:
Arthur Scholz.
Emil Hauser.
Inventor:
Carl Wittkowsky
by
Attorney.

UNITED STATES PATENT OFFICE.

CARL WITTKOWSKY, OF BERLIN, GERMANY.

METHOD OF WATERPROOF UNITING PIECES OF WOOD.

No. 855,870.  Specification of Letters Patent.  Patented June 4, 1907.

Application filed January 4, 1907. Serial No. 350,808.

*To all whom it may concern:*

Be it known that I, CARL WITTKOWSKY, a subject of the King of Prussia, German Emperor, and a resident of 121[a] Potsdamerstrasse, Berlin, Kingdom of Prussia, German Empire, manufacturer, have invented a certain new and Improved Method of Waterproof Uniting Pieces of Wood, of which the following is an exact specification.

My invention has for its object a new method of uniting veneers as to manufacture for instance veneer seats or panels and the like.

Several methods of uniting veneers are known, but especially two of them come in consideration. In the one method the liquid adhesive is brushed over the veneers and the latter ones are at once, before the adhesive is dried, united under a pressure. In the other method liquid adhesives are used too, but the latter is allowed to dry on the wood pieces, before they are finally united. The first method has the advantage of avoiding a tedious drying manipulation of the adhesive on the veneer, but the great disadvantage of a long lasting compression which takes up several hours of time. The second method has the advantage of uniting the veneers in a few minutes but the great disadvantage that the drying of the adhesive prior to compression takes up considerable time and space besides.

By employing the method of my invention all disadvantages of the former methods are avoided, whereas all advantages mentioned are obtained.

In order to achieve the purpose intended I must use a method and an adhesive therein having the following qualities: Firstly: the adhesive must be of a pasty consistency. Secondly: the adhesive must contain but such a quantity of water, as can be absorbed or bound by the mixture, when heated. Thirdly: the mixture used must become waterproof by the compression and heat. Fourthly: the adhesive must be applied by a mechanical operation. Fifthly: the method must require an immediate operation of compression of the veneers after the application of the adhesive on the veneers. Only such cementing medium that possess these five distinct qualities can be used successfully in my invention. The unique cementing medium employed has been found by me after a series of trials and consists of casein, lime and water-glass. These components are mixed well together until a paste-like mixture is attained, which, as a matter of course, can only be applied by a mechanical operation on the two sides of the veneer, and which mixture requires the immediate following of the compression operation under a heated press, after the application of same on the veneer to be united is done. Under heat and pressure the separate components of the mixture are chemically bound by the coagulation of the casein contained therein and at the same time the small quantity of water contained in the mixture is absorbed and bound by the chemical reaction of the components of the mixture during this heating process. Now, as there is no surplus water whatever left in the mixture, no steam can be developed by the heat. This point is very essential, for in the elder processes known it was one of the most troublesome obstacles to overcome, for the surplus moisture of the adhesive being converted into steam under the heat formed blisters holding this steam and the latter, being under a great tension escaped as soon as the pressure was released. This escape of steam however took place under heavy explosions, which caused the veneers to crack or split or covered them with blisters or black spots and stripes. Under those circumstances no joining of the veneer could be effected and a great waste of material was but a natural consequence. The principal cause of these deficiencies was the habit of employing liquid adhesives, whereby the veneer pieces were altogether too much moistened.

Now it is the purpose of my invention to do away with all these disadvantages of the elder methods by employing the means and steps fully described in the specification and in order to make the latter more clear, I accompany same by a drawing, where Figure 1 shows in a vertical sectional side view the method of the mechanical application of the cementing medium on a veneer to be united with two other veneers. Fig. 2 shows three veneer boards and Fig. 3 the uniting of the three veneers under a press.

In the drawings 1 represents lumps of cementing medium of the pasty consistency and the components as mentioned before, a full detailed description of which will be given later on.

2 is a center veneer board with fibers running in the direction of the arrow *m—n*, 3 is the upper and 4 the lower veneer-board with fibers running transversely to the ones of the center-board. 5 represents a pair of rolls rotating in the direction of the arrows shown.

The single steps of my method are as follows:—The center veneer 2 is forced through the cement lying in a lump before the rollers and placed between the rotating rollers 5. The latter grasp the board 2 and pull it through in the direction of the arrow, at the same time coating the board with an even and thin layer of cement 6 on both sides. Immediately after this operation of applying the cementing coating on a center board the outer boards 3 and 4 are placed upon the cemented surfaces of the center veneer, one on each side and they are at once carried under a heated press and subjected to an adequate pressure. Such a press is indicated in Fig. 3, where 7 represents the hollow press-plates and 8 the steam pipes or the conduits of some suitable heating medium. It is evident that this method of uniting veneers requires the least possible time, if the time from the application of the cement up to the leaving of the veneers from the heating press in a finished state is considered. If, for instance, 3 veneer boards of $\frac{1}{16}''$ thickness each are to be united, the whole operation is completed within about 3 to 4 minutes time. No time is lost by a previous drying manipulation, no space is required for the storing of the veneers to be dried, no surplus water in the cementing medium can cause a warping, a splitting or curling up of the veneers, as observed by the older methods employing a previous drying of the veneer. No steam developing under pressure from the applied heat can cause blisters or black spots on the veneers as was the case where cement of a liquid condition containing surplus water was employed. It is quite evident, if an adhesive of a liquid condition is used, the method of applying same by means of a brush will be employed, but if a pasty cementing medium is used, another method for the application of it must be thought of and the best one is to apply the cement by means of rollers, as is done in my method. But still another advantage is connected with the use of my described method. Formerly if three or more veneers with dried adhesives were to be united by heat and pressure, every veneer board had to be coated on the side or sides to be united with a layer of liquid adhesive, otherwise a perfect uniting could not be effected. This coating of one side and subsequent drying of the veneers however was the very cause of an enormous waste, as it made the veneers curl up, break and split. Now in my method only a very thin layer of a pasty cement without any surplus of water is applied to the two sides of the center-veneer only and no cement whatever is put on the outer veneers.

The cementing medium consists, as mentioned before, of a mixture of casein, lime and water-glass. Whey containing 25 percent of curds is used, to which curds water-glass and lime is added in such proportions as to form a pasty mass with the other ingredients. This mixture must have a pasty consistency, and it contains besides the fruit water of the casein 15 to 30 parts in weight of casein, 15 to 40 parts in weight of water-glass and 1 to 4 parts in weight of lime. If instead of curds dry casein in pulverized form is used, the same quantity of water must be added to this, as is usually contained in curds, which means an addition of 60–75% of water to 40–25% of casein. With above figures I wish to show by way of an example in which proportions about the single components are to be taken, but I do not wish to be understood that these very proportions must be kept in order to obtain the proper cementing mediums as is wanted for my method. Now if such a composition is subjected immediately after its application to heat and pressure a coagulation of the casein takes place and the small quantity of water contained in this composition is completely absorbed by this coagulation process. The total absence of water from the cementing medium after its compression is proved by the fact, that it has become perfectly waterproof by this operation of compression under heat.

In describing and illustrating the new method of mine the uniting of three veneer boards is chosen where the center-board is coated on two sides, and one outer board is placed on each side of it. As a matter of course the same method can be employed if more than 3 pieces are to be united. The application of the cement-coating to some veneers and the non-application to others has to be regulated according to the number of pieces to be united.

I am well aware of the fact that binding means of veneers of certain qualities are in use, but what I claim as new is a cementing medium of a pasty consistency, that embodies all the qualities desired in order to perform my method described.

I am also aware that the application of adhesives by mechanical appliances is well known in practice, but what I claim as new is the use of a cementing medium with all the qualities desired as fully described in combination with the mechanical application of same on veneer-boards by means of rollers, and a subjecting of such treated veneers to a heated pressure immediately after the application of the cement, which means and steps, if used in the form and succession as described in detail in this specification, will bring about the desired purpose in view, viz: the uniting of veneer boards in the least possible time with the least quantity of cement and without occupying much space and without having the amount of waste material as before.

Having thus fully described the nature of my invention, what I desire to secure by Letters Patent of the United States is:—

1. The method of waterproof uniting veneers in the least possible time for seats, panels and the like, consisting in firstly the application of a cementing medium of a pasty consistency composed of casein, lime and water-glass, the application being done by mechanical operation and resulting in a coating of the veneers with a thin and even layer of cement, secondly a placing of another non-coated veneer on each of the cemented sides of the coated veneer and thirdly the subjecting of the veneers put upon each other immediately afterward to a hot pressure.

2. The method of waterproof uniting veneers in the least possible time for seats, panels and the like, consisting in firstly the application of a cementing medium of a pasty consistency composed of casein, lime and water-glass, the application being done by means of a pair of rollers resulting in a coating of the veneer with a thin and even layer of cement, secondly a placing of another non-coated veneer on each of the cemented sides of a coated veneer, and thirdly the subjecting of the veneers put upon each other immediately afterward to a hot pressure.

In witness whereof I have hereunto set my hand in the presence of two witnesses.

CARL WITTKOWSKY.

Witnesses:
  WOLDEMAR HAUPT,
  HENRY HASPER.